Sept. 27, 1932.  G. M. BELLANCA  1,879,039
AIRPLANE CONSTRUCTION
Filed Feb. 9, 1931
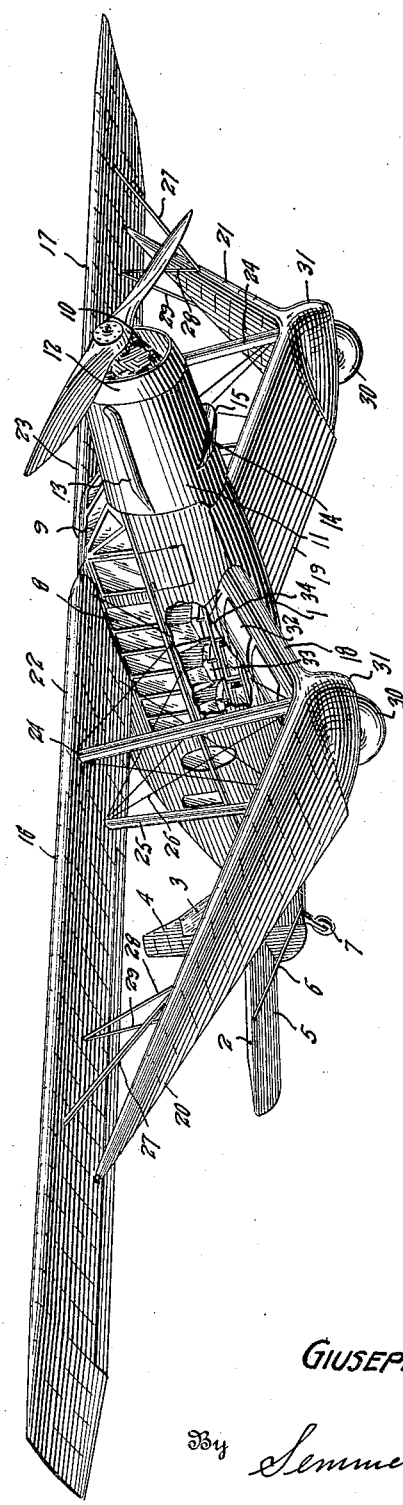
Inventor
GIUSEPPE M. BELLANCA
By Semmes & Semmes
Attorneys Patented Sept. 27, 1932

1,879,039

UNITED STATES PATENT OFFICE

GIUSEPPE M. BELLANCA, OF NEW CASTLE, DELAWARE

AIRPLANE CONSTRUCTION

Application filed February 9, 1931. Serial No. 514,607.

This invention relates in general to airplanes, and more particularly has reference to a novel construction for aircraft.

It has been sought, particularly in commercial practice, to produce an airplane capable of obtaining relatively high speeds, having a high carrying capacity and operating at a low power output, yet inherently stable.

Previous to this time aircraft having a high carrying capacity have usually required a large power output, and it has been difficult to construct such airplanes so that the same will be inherently stable in flight, and yet easily maneuverable.

In the past the load of such aircraft has generally been widely distributed with respect to the center of gravity of the airplane, and the stability has thus necessarily been sacrificed to a great degree. With this distribution of weight, a larger power output than would otherwise be required has been necessary.

An object of this invention is to provide an airplane having a high carrying capacity, operating on a low power output.

Another object of this invention is to provide an airplane having the weight concentrated around the center of gravity.

Still another object of this invention is to provide an airplane having a high carrying capacity, operating on a low power output inherently stable in flight.

Still another object of this invention is to provide an airplane having a high carrying capacity, operating on a low power output inherently stable and readily maneuverable.

A further object of this invention is to provide an airplane having a high carrying capacity operating on a low power output, designed to recover from abnormal positions in flight.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawing, means for carrying the same into practical effect without limiting the improvements in their useful applications to the particular constructions which, for the purpose of explanation have been made the subject of illustration.

In the drawing forming a part of this specification, there is illustrated in perspective an airplane constructed in accordance with my invention.

Referring more particularly by numerals to the drawing, the airplane shown comprises a fuselage 1, preferably constructed of round chrome, molybdenum, and steel tubing. The vital members are of extreme oversize construction to increase the safety factor. The rear section is braced by tie rods, designed to be proof against collapse, and the frame is covered with any suitable material, preferably fabric such as is ordinarily used in airplane construction.

The tail assembly, anchored on the rear of the fuselage, consists of the conventional horizontal and vertical stabilizing fins 2 and 3 and a rudder and elevator 4 and 5. The control surfaces are characterized by oversized dimensions affording instantaneous response. The controls are adapted to operate on large diameter bronze hinges requiring little attention other than periodical inspection.

The cables are so mounted that movement of the same gives instantaneous response of control surfaces, and are adapted to operate to the full extent without tightening or slackening thereof. The stabilizer is adjustable in flight by a large control wheel in the pilot's cock pit. The fin is adjustable on the ground. The stabilizer is braced on the horizontal fin by a strut 6, and a tail wheel 7 is mounted on the under side of the fuselage at its rear extremity.

The sides of the fuselage are interrupted by unshatterable glass windows 8, continuous with front windows 9 affording a full range of vision. A motor 10 is mounted in the nose of the fuselage below the front windows 9, and enclosed by a cowling 11, continuous with the fuselage. While the water cooled motor is shown, it is apparent that a radial motor may be substituted therefore with a different type of cowling.

The front rim of the cowling is tapered as at 12, and provided with aligned apertures on the sides of the periphery to accommodate exhaust ports from the motor communicating with a manifold 13, and a corresponding manifold on the other side (not shown).

Cooling of the motor is aided by the air entering the front of the cowling, and in addition by a slot 14 in the lower portion of the cowling, being directed therein by a scoop 15. The scoop is adjustable from the pilot's cock pit to control the amount of air admitted to thus regulate cooling of the motor.

The fuselage is provided with internally braced wings, comprising upper wing sections 16 and 17, and lower stub wing sections 18 and 19. The top and stub wing sections are joined by auxiliary tapered wings 20 and 21.

The top wings are preferably constructed of wood, and divided into inner or center section panels 22 and 23. The inner ends of the panels are joined to the sides of the fuselage at the top, and are continuous with the inner extremities of the main top wings at the outer ends.

The inner or center section panels of the top wings 22 and 23 in conjunction with the lower stub wings form an inner bay. The outer ends of the center section and the stub wings are joined by pairs of struts 24 and 25 and braced by streamlined wires 25, connecting the opposite extremities of the respective struts, and connecting the same with the inner ends of the center section panels and the stub wings. The struts 24 and 25 are constructed of round chrome molybdenum steel tubing faired with balsa wood.

The outer extremities of the stub wings are connected to the outer panels of the top wings, as has previously been stated by auxiliary tapered wings, adapted to act both as bracing struts and to provide for additional lift. These auxiliary wings 20 and 21 are tapered both in plane and thickness from the lower ends, where the same are joined to the stub wings, to the rear spar of the upper wing.

The mounting of the auxiliary wings on the under side of the outer panels of the top wing is reinforced by struts 27. These struts are connected between the leading edges of the auxiliary wings and the front spars of the outer panels of the top wing. The mounting of the auxiliary wings is further reinforced by pairs of struts 28 and 29, connected between the leading and trailing edges of the auxiliary wings to the central spar in the outer panels of the top wing.

The outer extremities of the stub wing sections are adapted to accommodate landing wheels 30, mounted in recesses where the auxiliary wings join. Air wheels are preferably employed, the upper portions of which are enclosed in fairings 31, streamlined with the stub and auxiliary wing surfaces.

The wheels are almost completely faired into the lower wing members so that the drag of the landing gear as a separate unit is practically eliminated and the benefits of a retractable gear are substantially obtained without the use of a retracting mechanism.

The stub wings are formed with compartments, access to which is had through covers 32, shaped to conform with the camber of the stub wings. These compartments, adapted to contain mail or other baggage, are adjacent the center of gravity of the airplane.

Seats 33, as shown in the cut away portion of the fuselage, are mounted on platforms 34. In this manner space is provided under each seat for storing baggage. Also, an uninterrupted space is left between the floor and ceiling of the fuselage intermediate the seats.

Of particular note is the fact that the seats are located about the center of gravity, so that the passenger baggage is likewise concentrated thereabout. The passenger seats in the fuselage are, moreover, so arranged with respect to the motor in the nose thereof that when carrying a normal load the airplane is in substantial balance longitudinally, laterally across the center of gravity. Equal fuel and baggage loads in the two center section panels and strut wings respectively similarly provide for substantial lateral balance. The fuel load is preferably distributed in conventional tanks fitted in the center section panels of the top wings.

It will thus be seen that accommodation of both the live and dead load is provided for about the center of gravity of the airplane. In thus concentrating the load, a high degree of stability is obtained, constituting a marked improvement over prior designs where the load has been widely distributed without particular regard to the relation of the same to the center of gravity of the airplane.

The specifications which I employ in the construction of an airplane in accordance with my novel design are as follows:

Type_____Cabin monoplane landplane
Number of seats_____12 (10 passengers and 2 pilots).
Engine_____600 or 575 H. P. single motor, geared 2 to 1.
Wing span_____65 feet
Wing area_____651 square feet
Length overall_____40 feet, 8 inches
Height_____ 11 feet, 6½ inches
Weight empty_____4950 pounds
Useful load_____4000–4500 lbs., according to equipment and power plant.

Payload_____10 passengers and 250 lbs of baggage plus 500-1000 lbs. of mail, according to cruising range required.
Full capacity_____200 gallons standard, but variable according to cruising range required.
Cabin capacity (including baggage, space and lavatory)_____400 cubic feet
Baggage compartment capacity_____35 cubic feet.
Mail compartment capacity____60 cubic feet The performance of an airplane constructed in accordance with my novel design has been proved in trial to be as follows:

*Performance at sea level with full load*

High speed_____147 M. P. H.
Cruising speed (2/3 full power)__125 M. P. H.
Service ceiling_____18,000 feet
Climb_____750 ft. per minute
Range with 200 gallons_____ 840 miles There is accomplished by this invention an airplane possessing exceedingly airworthy characteristics, having provision for concentrating both the live and dead load about the center of gravity and providing for lateral longitudinal and directional stability; yet highly maneuverable and allowing control at speeds even below stalling, showing no tendency to spin and practically none to stall, and automatically recoverable from abnormal positions.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. An airplane comprising top center section panels, lower stub wings of negative dihedral, tanks in the top center section panels adjacent the fuselage for carrying fuel, compartments opening in the top surfaces of the stub wings for carrying baggage, and closures for the compartments conforming with the configuration of the top surface of the stub wings.

2. An airplane comprising a fuselage, seats having compartments thereunder, within the fuselage on each side of and in the front and rear of the center of gravity of the airplane, to carry loads and passengers, and means outside the fuselage to carry loads on each side and above and below the same, the load carrying means below the center of gravity comprising an airfoil section of decided negative dihedral attached to the fuselage.

3. An airplane of close-coupled type having a power plant mounted in the nose and substantially on the longitudinal axis of the plane; an upper main airfoil section, and a lower negative dihedral airfoil section mounted below the center of gravity, a strut of airfoil form extending between the said wing section of the negative dihedral and the main wing; the main wing section being provided, at a point closely adjacent the fuselage, with containers; the said wing section of negative dihedral being provided with compartments of appreciable size for the reception of baggage and a substantially vertical strut attached to the outer end of the wing section of negative dihedral and extending upwardly and joined to the underside of the main wing; the said inner section of the main wing, the lower wing section of the negative dihedral, and the strut forming a trussed wing cellule in which the horizontal equivalent lifting surface of the lower airfoil surface within said cellule is less than the span of said cellule whereby the center of the load carried within said cellule is positioned relatively close to the longitudinal axis of the plane.

4. An airplane of the close-coupled cabin type having a fuselage and a power plant mounted forwardly of the center of gravity of the plane and substantially on the longitudinal axis of the plane; a main wing section mounted on the upper part of each side of the fuselage; lower airfoil sections of negative dihedral and of shorter span than the main wing section attached to the fuselage below the center of gravity of the plane; lift struts of airfoil construction extending from each of the said lower airfoil sections to the main wing section; the said lower airfoil sections being provided with compartments for the reception of pay loads, the fuselage comprising a box-like cabin section and a rear internally trussed section constituting a continuation of the cabin section; the cabin section being provided with seats positioned closely adjacent the longitudinal axis of the plane and baggage compartments beneath the seats whereby pay load of the plane is largely concentrated on the longitudinal and lateral axes of the plane and very closely adjacent the center of gravity.

In testimony whereof I affix my signature.

GIUSEPPE M. BELLANCA.